Inventors:
H. Scholler
R. Eickemeyer

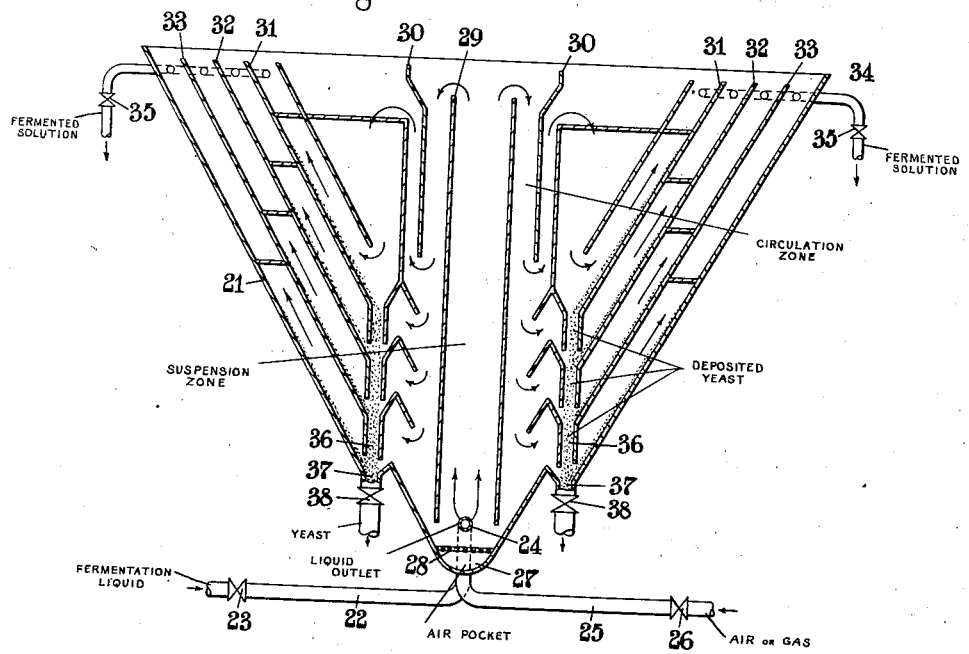
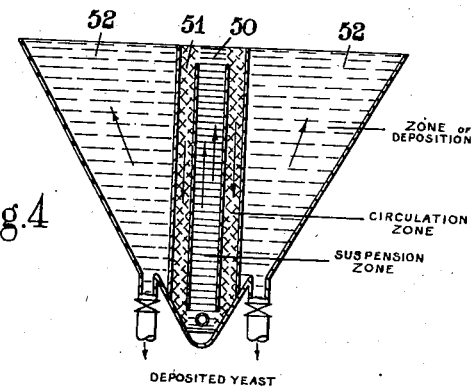

Patented June 8, 1937

2,083,348

UNITED STATES PATENT OFFICE 2,083,348

APPARATUS FOR THE PRODUCTION OF MICRO-ORGANISMS AND FOR THE FERMENTATION OF SOLUTIONS

Heinrich Scholler, Solln, near Munich, and Rudolf Eickemeyer, Munich, Germany

Original application September 24, 1934, Serial No. 745,340. Divided and this application April 23, 1936, Serial No. 76,082. In Germany January 10, 1933

12 Claims. (Cl. 195—142)

This application is a division of our co-pending application Serial No. 745,340, filed September 24, 1934.

This invention relates to an apparatus for carrying out the accelerated production of yeast and for the fermentation of solutions more particularly by the method disclosed in our co-pending application Serial No. 745,340. The method in question permits yeast to be obtained, and fermentation processes to be carried out, both continuously as well as intermittently. The method depends upon a combination of static and dynamic conditions, more particularly on the action of streaming conditions on suspensions and the deposition thereof and enables a considerable growth in the micro-organism and the separation of the same from the nutrient liquid to be carried out in a single operation with the substantially complete utilization of all nutrient constituents. The method is also applicable when the obtention of micro-organisms in substance does not come into question but only its use for biologically acting on the liquid, i. e. for carrying out fermentation processes or the like.

According to the method described in our co-pending application Serial No. 745,340 fermentation liquid flows through the fermentation chamber and holds the yeast cells present partly in suspension, whilst another part of the yeast present gradually settles on steep inclined surfaces disposed in the fermentation chamber and slides to the bottom as soon as the deposited yeast mud has reached a certain layer thickness. In order to carry this principle into effect operations are carried out preferably with very high pitching quantities of yeast (high yeast concentration). Whereas in the usual processes the quantity of yeast present amounts to only a few per cent of the total nutrient substances and fermentation products present, the method is advantageously carried out with quantities of yeast which are greater than the quantities of nutrient substances or fermentation products present.

The yeast masses which deposit copiously on the inclined surfaces particularly when using high yeast concentrations and which fall down to the bottom can be resuspended in the lower part of the fermentation chamber, for example by means of suitable mechanical stirring devices or else by stirring with air or other gases. A part of the quantity of yeast, proportioned according to the yeast growth, is preferably gathered or collected at the lower end of the fermentation apparatus, either intermittently or continuously, by letting off through a sluice arrangement, and if necessary thoroughly washed in the known manner, and may be worked up to a dry product.

If the withdrawal of the yeast is effected corresponding to the yeast growth then the yeast concentration in the fermentation chamber can be kept constant in this way. The fermentation liquid flowing through the fermentation chamber leaves the top of the vessel after the nutrient substances contained in it are more or less consumed by the yeast and the yeast suspended in it is wholly or for the most part deposited.

In order to secure a better effect vertical guiding surfaces are preferably disposed in the middle of the fermentation apparatus, said surfaces being tubularly or prismatically arranged. The following three zones are distinguished within the fermentation vessel (cf. Figure 4):

1. The suspension zone 50, which is surrounded by the vertical guiding surfaces and in which the yeast is kept in suspension in a high concentration by the upwardly flowing liquid;

2. The settling zone 52 which is disposed outside the suspension zone and in which the velocity of flow is retarded and the direction of flow may even be reversed, so that the yeast has an opportunity to settle on the inclined surfaces and to slide down;

3. In between the suspension zone and the settling zone there may also be the circulation zone 51 in which the fermentation liquid left moves from the top to the bottom and again enters the suspension zone.

The cross section of the suspension zone is preferably dimensioned so that the velocity of flow in that zone is automatically higher than in the settling zone.

It is advisable to supply a part of the micro-organism leaving the suspension zone, and may be also a part of the yeast sliding downwardly on the inclined surfaces, back into the suspension zone again in order to be able to maintain the desired high yeast concentration. This is effected by bringing about additional upward motion of the liquid in the suspension zone by suitable means. In this way the liquid coming over the top of the suspension zone sinks downwardly outside this zone into the so-called circulating zone and through openings provided at the lower end of the suspension zone enters into this latter again, carries along with it the yeast suspended therein and in certain cases drags with it an excess of deposited yeast which may be present and resuspends it. The additional upward motion of the liquid within the suspension zone can be effected in various ways, for example by means of a propeller stirring mechanism which can simultaneously subdivide again and suspend the excess yeast mud, or, with avoidance of mechanical devices, by blowing in gases, e. g. air, at the bottom of the suspension zone, in which case the air supply preferably has a cross section somewhat smaller than that of the suspension zone so that an injection action is produced as a result of which the excess yeast mud can be drawn up and suspended.

In the same way the gas blown in also acts according to the principle of the Mammut pump. It has been found that the desired effect can be produced in a particularly efficient manner by fine aeration.

In order to produce better separation of the yeast it is advantageous to install within the settling zone vertical or approximately vertical surfaces which again may be arranged in circular or prismatic fashion and have the object of compelling the liquid to reverse.

In a special form of carrying out the method the velocity of flow through the apparatus and the yeast concentration are regulated so that part of the yeast suspended in more or less exhausted fermentation liquid leaves the fermentation vessel in order, for the purpose of effecting further working up or deposition, to be subjected to a single or many times repeated treatment in the same or a similar manner.

Further, operations may also be carried out so that no withdrawal of yeast takes place within the first fermentation apparatus and a quantity of yeast corresponding about to the growth of the yeast suspended in the issuing exhausted fermentation liquid leaves the apparatus, then to be separated off in a suitable manner, e. g. by means of centrifuges.

This manner of working, which avoids automatic separation of the yeast in the fermentation vessel or at least in the first fermentation vessel, has, as compared with the usual yeast cultivation process, the further advantage that it operates continuously and moreover occupies only comparatively small space. The fermentation apparatus according to the present invention may be connected both in series as well as in parallel. The output capacity of the apparatus is, amongst other things, dependent on the size of the inclined surfaces present. It has therefore been found preferable to arrange several inclined surfaces one above the other, the downwardly sliding yeast, without being stirred up or agitated, being guided by means of suitable funnel-shaped devices from one inclined surface to another down to the lowest inclined surface, where the whole of the downwardly sliding yeast mud unites. The efficiency of an inclined surface is the greater the longer it is. It is preferable, therefore, so to adjust the streaming velocity over the individual inclined surfaces that the time of flow through just suffices to give the yeast opportunity to settle, in other words the rate of flow over the individual inclined surfaces is inversely proportional to the length of the inclined surfaces.

It is already known to promote the flocculation of micro-organisms, more particularly of yeast by adding alkali and by production of phosphate precipitates. It is also already known to bring about a similar action by means of flock lactic acid bacteria (referred to in German as "Flockenmilchsäurebakterien"). These known expedients can be used when employing the apparatus of this invention, the corresponding agents being added either in the settling zone or operations being carried out right from the start under conditions which are favourable for flocculating out yeast. Also micro-organisms which tend to produce flocculation may be employed in the process right from the commencement.

The apparatus is put into operation in the known manner by means of pitching yeast which is added, preferably in the form of mud, chiefly in the suepsnsion space, while the settling and circulation zones are filled with water. The addition of fresh seeding material may also be effected during the continuous operation for the purpose of refreshing the yeast, and takes place preferably within the suspension zone. If necessary, the lead for the fermentation liquid can be used as well for introducing fresh seeding material if a proper pipe for this purpose, like the lead for the fermentation liquid, is not provided. It is known to be advantageous in many respects to subject the yeast, before it is supplied to its purpose of use, to a ripening process, inasmuch as the time the yeast remains in the lower part of the settling and circulation zones is insufficient for ripening, the ripening of the withdrawn yeast may take place in the known manner in a subsequently arranged vessel. Owing to the high yeast concentration the method is comparatively resistant to infection. Moreover, owing to its small space requirement and the continuous manner of working the method may be carried out in the apparatus in a known sterile manner. The high concentration of the yeast also enables the method to be used for working up nutrient solutions which contain fermentation poisons or substances which check fermentation, such as is the case with, for example, wood sugar liquors obtained by hydrolysis with dilute acid. The quantity of poisonous substances gaining access to the yeast cells is, in consequence of the high yeast concentration, so small that it can be forthwith freed from poison by the cells.

A further special advantage is that the so-called humin substances contained in the wood sugar liquor are prevented from settling since the fermentation liquid (wood sugar liquor with nutrient salts) flows through the apparatus in a comparatively short time. In the case of small apparatus the time of passage through the apparatus in which the fermentation takes place is less than an hour, with large apparatus a flow time of some few hours is to be reckoned with.

Forms of the apparatus provided by the invention are described below with reference to the accompanying drawings together with a description of the manner in which the process is carried out with the apparatus.

In the accompanying drawings:

Fig. 3 is a sectional elevation through an improved form of fermentation apparatus (yeast production vessel), such as is particularly suitable for carrying out the process on a large scale.

Fig. 4 shows a subdivision into zones of the fermentation vessel according to Fig. 2.

Figure 1:
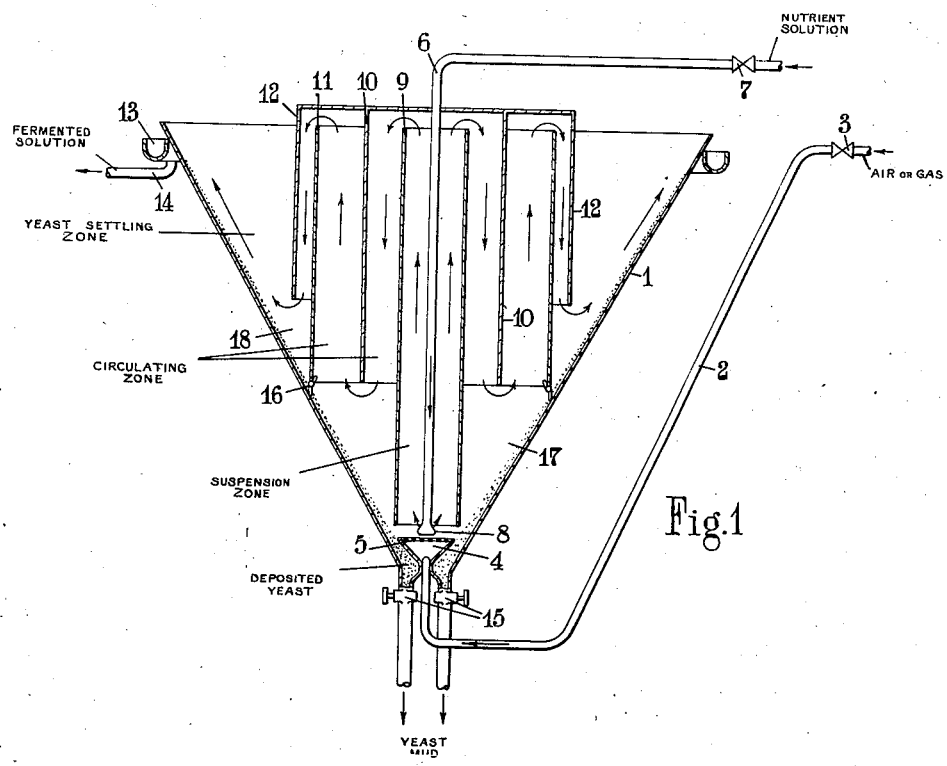
Fig. 1 is an axial sectional elevation through a fermentation apparatus with simple treatment device.
Figure 2:
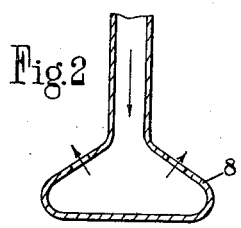
Fig. 2 is a detailed representation on a larger scale of the part 8 or Fig. 1.

In Fig. 1, 1 is an inverted conical or pyramidal vessel into which is led in the proximity of the bottom an air or gas supply pipe 2 with a regulating cock 3 and a fine aeration device 4, which is provided at the top with a filter plate 5 or the like. The supply pipe 6 is for the nutrient solution and has the regulating valve 7 and a funnel-shaped widened portion 8 at the lower end thereof (see also Fig. 2) which is closed underneath and has exit orifices at the top. Tubular or pipe members 9, 10, 11, 12, of the cylindrical or polygonal cross section, and open at the bottom and the top, dip into the funnel-shaped vessel 1 at the top thereof; the members with even reference numerals project somewhat out of the funnel-shaped vessel 1, whilst those with odd reference numerals are cut off at about the same level as the upper edge of the vessel or somewhat below this level. An overflow channel 13, with one or several outlets 14, is provided. Closable disks, plates or the like, 15, are provided for letting off the yeast mud. The arrows indicate the most important directions of flow of the gases and liquids.

The manner of working the apparatus is as follows:

First consider the funnel-shaped vessel 1 to be full of liquid (nutrient solution). Fresh nutrient solution is then supplied downwardly through the pipe 6 up to the proximity of the filter plate 5 for the air supply. The air streams upwardly in fine bubbles and, in accordance with the injector or Mammut principle, causes the liquid with a large part of the yeast suspended therein to be guided upwardly again within the pipe 9, as a result of which the yeast has opportunity to grow copiously in the fresh nutrient solution. When the liquid stream reaches the top of the pipe 9 it tends to spread radially outwards, but soon comes up against the projecting end of the pipe 10 and is there downwardly deflected in the annular space between 9 and 10. The pipe 10 terminates at a distance from the side wall of the funnel-shaped vessel such that if necessary a part of the now downwardly moving suspension is led back by the injector action of the aeration device into the ascending current within the pipe 9 and in this way continuously circulates there. Another part of the suspension follows the direction of flow which branches off at the lower end of the pipe 10 and is again brought to the top in the annular space between pipe 10 and pipe 11, where it spreads out in a radial direction again over the top end of the pipe 11, is checked again by the pipe 12 as in the case of the pipe 10, flows down the annular space between pipe 11 and pipe 12, divides anew at the bottom of pipe 12, and so on.

At the first branching point of the direction of flow (at 17 in Figure 1) there is such a check according to the invention that the specifically heavier yeast parts, the settling tendency of which within the pipe 9 has been compensated for and overcome by the action of the ascending small bubbles of air, separate to a considerable extent from the flowing liquid, corresponding to the gravity, sink down onto the wall of the funnel-shaped vessel 1 and then under the action of gravity fall into the lowest part of the vessel, where they either collect around the air supply pipe and can be drawn off from time to time, or where they can be continuously withdrawn by means of suitably opened withdrawal valves or slides.

The circulation flow, which now forces the liquid upwardly again in the space between pipes 10 and 11, takes a part of the yeast with it again but in a much smaller quantity than formerly since there is no air stream here, which latter of course has already left the apparatus again at the top of pipe 9, and since the rate of flow is lower. The separation process is repeated at 18 insofar as the suspension still contains yeast, and the method may be conducted so that the liquid can now be led away practically without any loss in yeast. If the necessity should arise there is nothing to prevent still further pipes being installed for the purpose of completing the yeast separation. According to the conditions of the case in certain circumstances even fewer pipes may be provided than are shown in the accompanying drawings.

The angle of the side wall of the funnel-shaped vessel is determined on the basis of the angle of repose in such a way that, bearing in mind the surrounding liquid medium, a thicker collection of yeast on the wall of the vessel is avoided.

In order to regulate the flow both as regards its direction as well as its partial speed rotatable flaps 16 are provided which enable the cross section of the liquid between the lower end of the pipe in question and the outer wall of the funnel-shaped vessel to be varied at suitable places. These flaps serve more particularly to reduce the impact of the laterally deviated parts of the liquid on the yeast which slides down on the lateral wall. In this way any upsetting of the process is prevented, which was made apparent by the yeast deposited on the upper part of the side wall and travelling in a downward direction being stirred up again and being conducted to the top.

Figure 3 shows a sectional elevation of a fermentation apparatus constructed on essentially the same principle as the apparatus shown in Figure 1, but which is provided with a system of inclined surfaces, and which is capable of handling greater outputs and is suitable for larger scale working. Instead of the funnel-shaped vessel the prismatic trough 21 which narrows off at the bottom is used. The manner in which the apparatus works is as follows:

The fermentation liquid is supplied through the pipe 22 and can be regulated by the valve 23. The fermentation liquid passes through the device 24, which is provided preferably at the top with small openings, into the suspension zone 50 (Figure 4) within the prismatically disposed guiding surfaces 29. At the same time air is introduced into the air space 27 through the pipe 25 and regulating valve 26; the air is finely divided by the air subdividing device (filter 28). The ascending air at the same time sucks up fermentation liquid from below and any excess yeast mud which may be present. At the top edge of the guiding surfaces 29 the liquid enters the circulation zone 51 (cf. Figure 4). A part of the liquid gets into the suspension space again at the lower end of the guiding surface 29 while another part flows into the inclined surface system 31, 32 and 33. The baffle surface 30 which is shown is advisable but is not absolutely necessary. The yeast still present in the fermentation liquid deposits on the inclined surfaces 31, 32 and 33 whilst the liquid freed from the yeast can be withdrawn through the run-off pipe 34. The rate of flow between the individual inclined surfaces may amongst other things also be regulated by controlling the withdrawal (by means of valve 35) in which case a separate regulable withdrawal device may be arranged between each two inclined surfaces.

The yeast which settles on the inclined surfaces 31, 32 and 33 and on the inclined wall of the trough 21 slides to the bottom and is collected by the funnel-shaped devices 36 in such a way that reagitation of the yeast is avoided.

The collecting yeast mud can be withdrawn by means of the pipe 37 and closure member 38.

In Figures 4 the three zones of the fermentation apparatus, the suspension zone 50, the settling zone 52 and the circulation zone 51 are indicated schematically. The individual zones 50, 51 and 52 are distinguished by shading. The advantages of using the apparatus according to the invention for carrying out yeast cultivation and fermentation consist in the small space requirement and the high performance of the apparatus, in the automatic separation of the yeast, in the resistivity of the fermentation process carried out in the apparatus to infection and fermentation poisons, in the suitability of the apparatus for carrying out sterile fermentation and, inasmuch as aeration takes place, in an economical and efficient aeration since in view of the high yeast concentration present in the suspension space only comparatively small quantities of air are used.

What we claim is:—

1. An apparatus for fermenting solutions to produce products of fermentation and to produce micro-organisms such as yeast, comprising a vessel having side walls diverging upwardly, collecting means adjacent the bottom of said vessel cooperating with said side walls to receive micro-organisms deposited on said side walls, means to supply a fermentation liquid to said vessel, means to guide the flow of the fermentation liquid in a substantially upward and downward direction in said vessel, means to remove the fermented liquid after it has completed its travel in said vessel, and means to remove the collected micro-organisms.

2. An apparatus for fermenting solutions to produce products of fermentation and to produce micro-organisms such as yeast, comprising a vessel having side walls diverging upwardly, collecting means adjacent the bottom of said vessel cooperating with said side walls to receive micro-organisms deposited on said side walls, means to guide the flow of the fermentation liquid in a substantially upward and downward direction in said vessel, means to supply fermentation liquid between said guide means, means to supply a gaseous fluid adjacent the supply means, means to remove the fermented liquid after it has completed its travel in said vessel, and means to remove the collected micro-organisms.

3. An apparatus for fermenting solutions to produce products of fermentation and to produce micro-organisms such as yeast, comprising a vessel having side walls diverging upwardly, collecting means adjacent the bottom of said vessel cooperating with said side walls to receive micro-organisms deposited on said side walls, means to supply a fermentation liquid to said vessel, means to guide the flow of the fermentation liquid in a substantially upward and downward direction in said vessel, means cooperating with the side walls and at least some of the guide means for adjusting the rate at which the deposited micro-organisms are delivered to the collecting means, means to remove the fermented liquid after it has completed its travel in said vvessel, and means to remove the collected micro-organisms.

4. An apparatus for fermenting solutions to produce products of fermentation and to produce micro-organisms such as yeast, comprising a vessel having side walls diverging upwardly, collecting means adjacent the bottom of said vessel cooperating with said side walls to receive micro-organisms deposited on said side walls, means to guide the flow of the fermentation liquid in a substantially upward and downward direction in said vessel, means to supply fermentation liquid between said guide means, means to supply a gaseous fluid adjacent the supply means, means cooperating with the side walls and at least some of the guide means for adjusting the rate at which the deposited micro-organisms are delivered to the collecting means, means to remove the fermented liquid after it has completed its travel in said vessel, and means to remove the collected micro-organisms.

5. An apparatus for fermenting solutions to produce products of fermentation and to produce micro-organisms such as yeast, comprising a vessel having side walls diverging upwardly and inclined at an angle greater than the angle of repose of the micro-organisms deposited thereon, collecting means adjacent the bottom of said vessel cooperating with said side walls to receive micro-organisms deposited on said side walls, means to divide the interior of said vessel into suspension, circulation, and micro-organism settling zones, said dividing means also constituting guide means to direct the flow of the fermentation liquid in a substantially upward and downward direction in said vessel, means to supply fermentation liquid adjacent the suspension zone, means to remove the fermented liquid after it has completed its travel in said vessel, and means to remove the collected micro-organisms.

6. An apparatus for fermenting solutions to produce products of fermentation and to produce micro-organisms such as yeast, comprising a vessel having side walls diverging upwardly and inclined at an angle greater than the angle of repose of the micro-organisms deposited thereon, collecting means adjacent the bottom of said vessel cooperating with said side walls to receive micro-organisms deposited on said side walls, means to divide the interior of said vessel into suspension, circulation, and micro-organism settling zones, said dividing means also constituting guide means to direct the flow of the fermentation liquid in a substantially upward and downward direction in said vessel, means to supply fermentation liquid adjacent the suspension zone, means to supply a gaseous fluid adjacent the fermentation supply means, means to remove the fermented liquid after it has completed its travel in said vessel, and means to remove the collected micro-organisms.

7. An apparatus for fermenting solutions to produce products of fermentation and to produce micro-organisms such as yeast, comprising a vessel having side walls diverging upwardly and inclined at an angle greater than the angle of repose of the micro-organisms deposited thereon, collecting means adjacent the bottom of said vessel cooperating with said side walls to receive micro-organisms deposited on said side walls, means to divide the interior of said vessel into suspension, circulation, and micro-organism settling zones, said dividing means also constituting guide means to direct the flow of the fermentation liquid in a substantially upward and downward direction in said vessel, means to supply fermentation liquid at the bottom of the suspension zone, means adjacent the top of said vessel to remove the fermented liquid after it has completed its travel in said vessel, and means to remove the collected micro-organisms from said collecting means.

8. An apparatus for fermenting solutions to produce products of fermentation and to produce micro-organisms such as yeast, comprising a vessel having side walls diverging upwardly and inclined at an angle greater than the angle of repose of the micro-organisms deposited thereon, collecting means adjacent the bottom of said vessel cooperating with said side walls to receive micro-organisms deposited on said side walls, means to divide the interior of said vessel into suspension, circulation, and micro-organism settling zones, said dividing means also constituting guide means to direct the flow of the fermentation liquid in a substantially upward and downward direction in said vessel, means to supply fermentation liquid at the bottom of the suspension zone, means to supply a gaseous fluid at the bottom of the suspension zone, means adjacent the top of said vessel to remove the fermented liquid after it has completed its travel in said vessel, and means to remove the collected micro-organisms from said collecting means.

9. An apparatus for fermenting solutions to produce products of fermentation and to produce micro-organisms such as yeast, comprising a vessel having side walls diverging upwardly and inclined at an angle greater than the angle of repose of the micro-organisms deposited thereon, collecting means adjacent the bottom of said vessel cooperating with said side walls to receive micro-organisms deposited on said side walls, means to divide the interior of said vessel into concentric, suspension, circulation, and micro-organism settling zones, said dividing means also constituting guide means to direct the flow of the fermentation liquid in a substantially upward and downward direction in said vessel, means to supply fermentation liquid at the bottom of the suspension zone, means to supply a gaseous fluid at the bottom of said suspension zone, means adjacent the top of said vessel to remove the fermented liquid after it has completed its travel in said vessel, and means to remove the collected micro-organisms from the collecting means.

10. An apparatus for fermenting solutions to produce products of fermentation and to produce micro-organisms such as yeast, comprising a vessel having side walls diverging upwardly and inclined at an angle greater than the angle of respose of the micro-organisms deposited thereon, collecting means adjacent the bottom of said vessel cooperating with said side walls to receive micro-organisms deposited on said side walls, means to divide the interior of said vessel into concentric, suspension, circulation, and micro-organism settling zones, said dividing means also constituting guide means to direct the flow of the fermentation liquid in a substantially upward and downward direction in said vessel, means cooperating with said side walls to reduce the impact of the liquid with the micro-organisms deposited on said walls, means to supply fermentation liquid at the bottom of the suspension zone, means to supply a gaseous fluid at the bottom of said suspension zone, means adjacent the top of said vessel to remove the fermented liquid after it has completed its travel in said vessel, and means to remove the collected micro-organisms from the collecting means.

11. An apparatus for fermenting solutions to produce products of fermentation and to produce micro-organisms such as yeast, comprising a vessel having side walls diverging upwardly, means to divide the interior of said vessel into suspension, circulation, and micro-organism settling zones, said dividing means also constituting guide means to direct the flow of the fermentation liquid in said vessel in a substantially upward and downward direction, means to collect the deposited micro-organisms, means in the settling zone to receive the deposits of micro-organisms and deliver the same to the collecting means, means to supply fermentation liquid to the suspension zone, and means to remove the fermentation liquid after its travel in said vessel.

12. An apparatus for fermenting solutions to produce products of fermentation and to produce micro-organisms such as yeast, comprising a vessel having side walls diverging upwardly, means to divide the interior of said vessel into suspension, circulation, and micro-organism settling zones, said dividing means also constituting guide means to direct the flow of the fermentation liquid in said vessel in a substantially upward and downward direction, means to collect the deposited micro-organisms, deposition surfaces disposed in the settling zones at an angle greater than the angle of repose of the depositing micro-organisms, said surface being disposed to deliver the depositing micro-organisms to said collecting means, means to supply fermentation liquid at the bottom of the suspension zone, means to supply a gaseous fluid at the bottom of the suspension zone, and means to remove the fermentation liquid after its travel in said vessel.

HEINRICH SCHOLLER.
RUDOLF EICKEMEYER.